Aug. 26, 1930.      R. L. CHETTICK      1,774,226

UNIVERSAL JOINT

Filed April 13, 1929

INVENTOR
Robert L. Chettick
BY
 ATTORNEY.

Patented Aug. 26, 1930

1,774,226

UNITED STATES PATENT OFFICE

ROBERT L. CHETTICK, OF PAWHUSKA, OKLAHOMA, ASSIGNOR OF ONE-HALF TO T. J. LEAHY, OF PAWHUSKA, OKLAHOMA

UNIVERSAL JOINT

Application filed April 13, 1929. Serial No. 354,911.

My invention relates to improvements in universal joints, such as are employed in automobiles and like vehicles for coupling the propeller shaft with the transmission shaft, and more particularly to the ball and sleeve assembly which encloses the universal joint and which is mounted upon and telescopes with one end of the propeller shaft tube.

Wear upon these parts caused by back and forward sliding movement of the propeller shaft tube within the ball sleeve, occasioned by disengagement and reengagement of the driving clutch and the general operation of the vehicle during travel, is noticeable in a relatively short period of time, and, unless these parts are then renewed, damage may be done to numerous driving parts of the automobile which are subjected to end and side thrusts resulting from looseness between the worn sleeve and tube.

The object of my invention is to provide a universal joint ball and sleeve assembly which may be readily and quickly adjusted to compensate for wear without the aid of skilled mechanics, and obviating the necessity of pulling down the rear end to replace the worn ball and sleeve and propeller shaft tube.

A further object of my invention is to provide a ball assembly with a tapered sleeve having a long, split, conical bushing which is held by the sleeve in proper position at all times to slidably support the forward end of a propeller shaft tube, the bushing being capable of longitudinal adjustment from one end of the sleeve to compensate for wear between the propeller shaft tube and bushing. Other objects and advantages of my invention will be more apparent from the following description and claims.

Referring now to the accompanying drawings, which are made a part hereof, and on which similar reference characters indicate similar parts;

Figure 1:
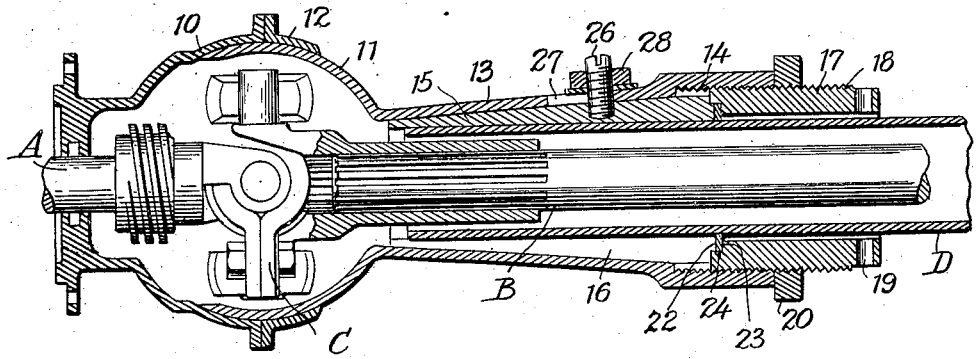
Fig. 1 is a view partly in section of a universal joint assembly, constructed in accordance with my invention, and showing the relation of the several parts in use.

In the drawings the portion indicated as A represents the power transmission shaft, B the main drive shaft or propeller shaft, C the universal driving connection between these shafts, and D is the propeller shaft tube which encloses the shaft B. All of these parts may be of any well-known or approved construction and design, provided they do not depart from the spirit of my invention.

Figure 2:
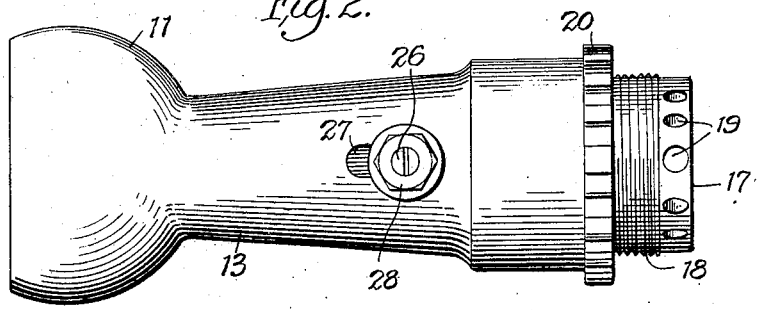
Fig. 2 is a plan view of the rear ball and sleeve assembly which constitutes the essence of my invention.
Figure 3:
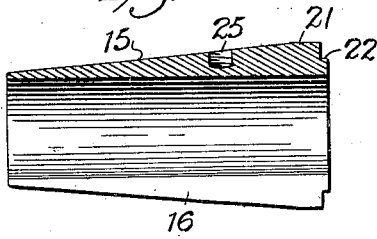
Fig. 3 is a longitudinal sectional view of the wear compensating sleeve or bushing shown assembled in Fig. 1.
Figure 4:
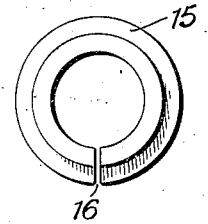
Fig. 4 is a rear end view of the bushing shown in Fig. 3.
Figure 4:

Surrounding the universal connection C of the shafts A and B is a universal housing consisting of a fixed front member or ball retaining socket 10 and a rear ball assembly 11. The rear ball assembly 11 is swiveled in the socket 10 and held against longitudinal movement by a retaining collar 12 detachably secured to the rear end of the socket. The front end of the ball assembly 11 is of conventional construction and carries at its rear end a sleeve 13. By reference to Figs. 1 and 2 of the drawings it will be noted that the sleeve 13 is provided with internal threads 14 at its rear end, and between the ball 11 and the threaded end portion 14 the sleeve is internally flared to provide a smooth tapered surface, the larger diameter being adjacent the threaded end 14.

Within the tapered portion of the sleeve 13 is disposed a longitudinally adjustable wear compensating sleeve or bushing 15 which is longitudinally split at 16 to permit it to be contracted. The interior of the sleeve or bushing 15 is of uniform diameter throughout to telescope upon the forward end of the propeller shaft tube D. The exterior surface of the split sleeve or bushing 15 is tapered complementarily to the interior of the flared sleeve 13, so that the split sleeve or bushing may be forced endwise into the sleeve 13 for uniformly contracting the bushing about the propeller shaft tube D.

A cylindrical adjusting screw 17 is provided with external threads 18 for cooperation with the internal threads 14 on the sleeve 13 to afford means for longitudinally adjusting the split sleeve or bushing 15 within the sleeve 13. By reference to Fig. 1 it will be seen that the adjusting screw 17 protrudes rearwardly from the sleeve 13 and loosely encircles the propeller shaft tube D, whereby said adjusting screw may be accessible for operation by any desired means, such as for example a spanner wrench, inserted in radial apertures 19 circumferentially spaced adjacent the rear end of the screw. A lock nut 20 is threaded onto the adjusting screw 17 to abut the rear end of the tapered sleeve 13 and lock the parts in adjusted position.

The tapered surface of the split sleeve or bushing 15 is reduced in diameter adjacent its larger rear end 21 to prevent contact with and injury to the threads 14 of the sleeve 13 during adjustment and is further provided with a reduced axial extension 22 which fits into a cooperating recess 23 in the opposed face of the adjusting screw. A dirt excluding and grease retaining gasket 24 is inserted between the cooperating portions 22 and 23 to hold said gasket firmly in contact with the surface of the propeller shaft tube D. The split sleeve 15 is also provided with a threaded depression 25 for the reception of a set screw 26, which in assembled position, extends through an axial slot 27 in the body of the sleeve 13 and a nut 28 is threaded onto the set screw 26 for locking the sleeve 13 and bushing 15 in adjusted position. It will thus be seen that the adjusting screw 17 may be disengaged from the sleeve 13 and the sleeve and adjusting screw slid rearwardly on the propeller shaft tube to afford access to the enclosed driving parts A, B and C, without the necessity of removing the rear end from under the automobile.

It will be obvious that various changes may be made in my device without departing from the spirit of the invention and I therefore do not limit myself to what is shown in the drawing and described in the specification but only as indicated in the appended claims.

What I claim is:

1. A universal joint ball and sleeve assembly for a propeller shaft tube, comprising a hollow ball member, a sleeve connected to said ball and having a tapered internal surface, a split tubular member mounted in said sleeve to telescope with said propeller shaft tube, and means cooperating with said sleeve and tubular member for contracting the latter.

2. The structure defined in claim 1 in further combination with means for locking said sleeve and tubular member against relative movement.

3. A wear compensating ball and sleeve assembly for the forward end of propeller shaft tubes, comprising inner and outer correspondingly tapered sleeves, one of said sleeves having a ball-shaped enlargement at one end and the other being slotted to permit its contraction, and means for moving one of said sleeves longitudinally of the other.

4. A universal support for the forward end of propeller shaft tubes, comprising a ball and sleeve assembly, said sleeve being threaded at its free end and internally tapered from the ball to a point adjacent the threaded end, a wear compensating tubular member mounted in said sleeve and adapted to telescope with said propeller shaft tube, said tubular member having its external surface tapered complementarily to the internal taper of said sleeve, and an adjusting screw for said tubular member having threaded engagement with said sleeve.

5. The structure defined in claim 4 in further combination with means carried by said tubular member and extending through a slot in said sleeve for locking said sleeve and tubular member against relative movement.

In testimony whereof I affix my signature.

ROBERT L. CHETTICK.